July 30, 1957
D. H. BONSTEEL ET AL
2,801,060
AIRCRAFT TRIM CONTROL
Filed Dec. 14, 1954
2 Sheets-Sheet 1
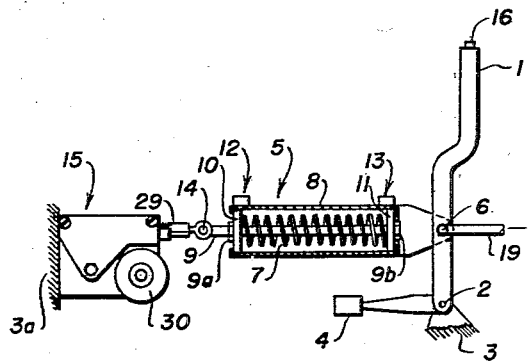
Fig. 1
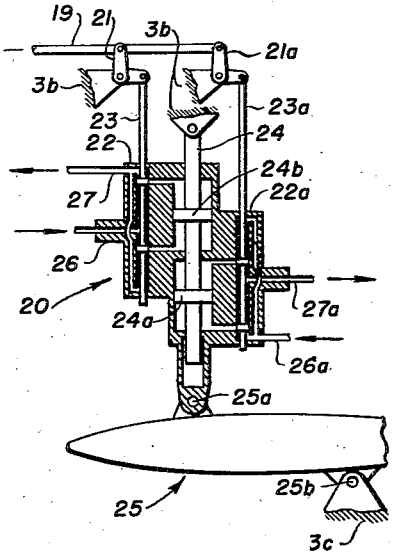
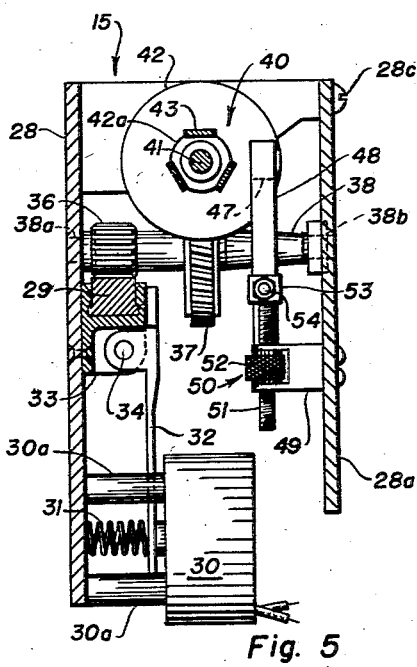
Fig. 5
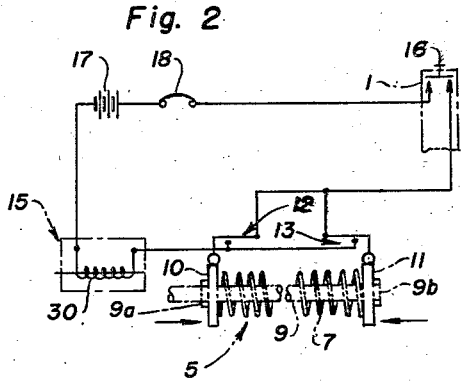
Fig. 2
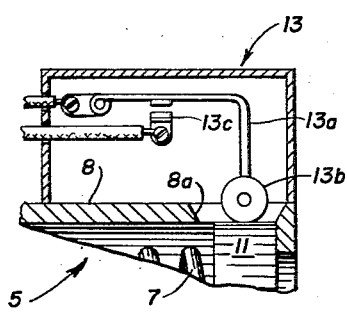
Fig. 2A
Donald H. Bonsteel &
Carl C. Starbeck
INVENTORS.
BY *James M. Clark*
ATTORNEY.

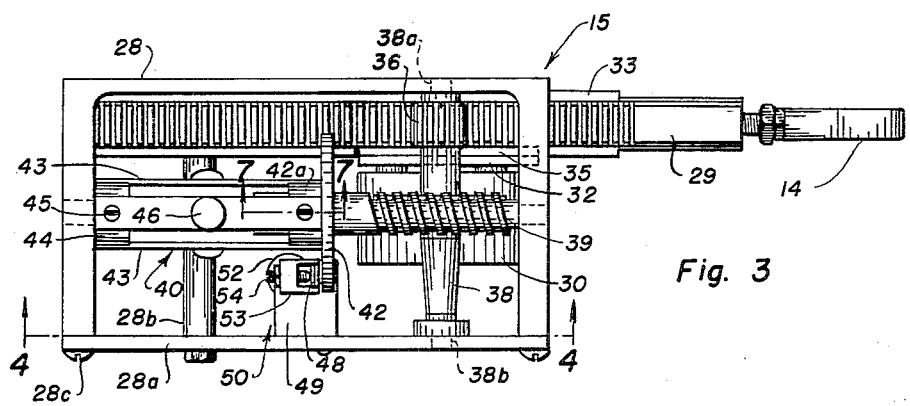
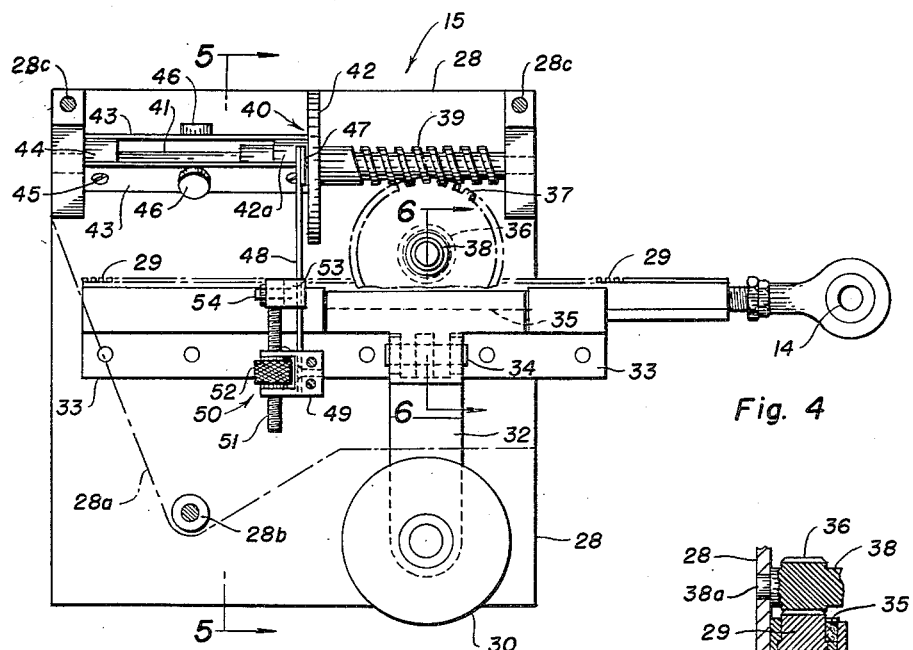
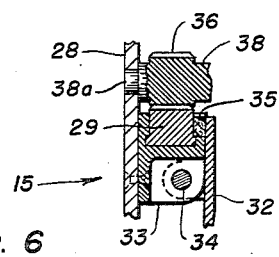
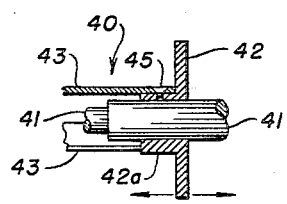
Donald H. Bonsteel &
Carl C. Starbeck
INVENTORS.

United States Patent Office 2,801,060
Patented July 30, 1957

2,801,060

AIRCRAFT TRIM CONTROL

Donald H. Bonsteel, Inglewood, and Carl C. Starbeck, Los Angeles, Calif., assignors to North American Aviation, Inc.

Application December 14, 1954, Serial No. 475,213

4 Claims. (Cl. 244—83)

The present invention relates to aircraft controls and more particularly to improved mechanism for accomplishing the trimming of the control surfaces and other components of an airplane or the like.

In the operation of modern high speed aircraft, it is frequently necessary to adjust the controls of the aircraft in order that it is properly balanced or trimmed such that it will maintain a desired attitude or course in flight. The conditions which affect the trim of the airplane are due to a number of factors normally encountered in flight due to variations in loads, power plant output, aircraft maneuvers and other causes. They frequently require the immediate attention of the pilot, who in single-place aircraft usually has a multitude of other duties. Trimming means such as adjustable surfaces, stabilizers, control surfaces or trailing edge trim tabs with appropriate adjusting mechanism have, accordingly, been provided to relieve the pilot from the continual application of control forces to maintain a given course or attitued of the airplane. Where such trim facilities are applied to high speed aircraft, they are frequently associated with powered or servomotor actuation of the component to be adjusted, and since the control system is usually irreversible in that the aerodynamic forces are not transmitted directly to the control stick or its equivalent, a certain amount of artificial feel must be provided.

The present invention is directed to an improvement in prior artificial feel control systems of high speed aircraft which have been designed to give the pilot full control of the pitch and lateral control surfaces without the necessity of exerting extreme forces at the control stick. These prior artificial feel control systems are usually irreversible, i. e., aerodynamic forces acting on the stabilizer, elevator or aileron surfaces are not transmitted back to the control stick. Such existing artificial feel control systems frequently consist of the control stick with an attached bobweight, a stick bungee with its stick centering springs, the servomotor unit for the surface and a trim actuator device which serves to move the neutral or ground point of the artificial feel bungee.

During level flight in such prior artificial feel control systems, when the pilot has to maintain a certain force at the control stick and he desires to reduce this force to zero, he usually moves a two-way trim switch button on the control stick for the desired trim direction. This serves to close the circuit to the reversing trim actuator motor and causes movement of the trim device and thereby the bungee toward its zero force position. If trimming in the opposite direction is required, the trim-button is moved in the corresponding direction, thus reversing the action of the trim device. Such prior systems have several inherent disadvantages, principally in that the pilot has to be able to feel when the stick force has become zero and, at that precise moment, to disengage the trim button to prevent trim overshoot or overcontrol.

The present invention is directed to an improvement in such systems by utilizing the bungee spring forces to effect the desired trimming action with an adjustable governor type trim control. While governor type trim devices have been proposed and used heretofore in order that the trimming action be accomplished at reasonable and controlled speeds, they have most frequently been utilized in conjunction with motor-driven trim devices which have been proportionately heavy and more complicated in construction and control. The improved mechanism, accordingly obviates the necessity of a powered or motor drive for the trim device and is simple and foolproof in operation, lighter-in-weight and less complicated than such prior devices. It is also an object to provide means for controlling or adjusting the rate of change of bungee setting by controlling the effect of the governor. It is also an object of the present invention to provide such a system of an improved type in which there is always adequate feel in the controls. These and other advantages and objects will become apparent to those skilled in the art from a study of the following description and the accompanying drawings, forming a part hereof, in which:

Fig. 1 is a diagrammatic general arrangement view of the improved governor type trim device applied to the trim control for the horizontal stabilizer of an aircraft;

Fig. 2 is a schematic wiring diagram of the electric circuit for the manual control of the trim device from the control stick as conditioned by the spring bungee position;

Fig. 2A is a detail view of one of the sensing switches carried upon the bungee unit of Figs. 1 and 2;

Fig. 3 is a detailed plan view of the improved governor type trim device;

Fig. 4 is a side elevational view of the same;

Fig. 5 is a transverse sectional view of the trim device as taken along the lines 5—5 of Fig. 4;

Fig. 6 is a detailed sectional view as taken along the lines 6—6 of Fig. 5; and

Fig. 7 is a detailed view of a portion of the governor of the trim device as taken along the lines 7—7 of Fig. 3.

Referring now to Fig. 1, there is diagrammatically illustrated a preferred form of the improved governor type trim device as applied, for example, to the horizontal stabilizer of an aircraft, although it will be understood that it may be applied to any other control surface or component which may require trim adjustment in flight. The control system comprises essentially the control stick 1, which is pivotally attached to the bungee spring unit 5, which is adjustably connected by the improved trim device 15 to fixed aircraft structure, and the control stick is connected by suitable operating mechanism to the hydraulic type servomotor 20 for adjustment of the surface component 25. As indicated above, while the invention is shown and described in connection with an adjustable stabilizer, it will be understood that it is equally applicable to the ailerons, elevator trim tabs or any other adjustable component which is used for trimming the airplane. In the example which has been illustrated, the entire horizontal tail surface is used as a control surface and consists essentially of two sections, a forward section 25 which is the stabilizer, and a rear or elevator section (not shown). The stabilizer is pivoted preferably at its rear spar and is positioned by the hydraulic cylinder 20 which may preferably be attached at its front spar. The elevator in the present installation is preferably connected to the stabilizer by a linkage arrangement and moves in a manner similar to that of a reverse boost tab.

The control stick 1 is pivotally mounted at the torque tube 2 supported from the fixed aircraft structure 3, and the stick has attached thereto the bobweight 4, the function of which is to increase the stick force during normal acceleration. While in level flight, the effect of the bobweight is cancelled by the elastic bungee spring or other force sensing means in the unit 5. The stick 1 is pivotally connected to the bungee unit 5 at the pivot 6 and this unit contains a compression spring 7 within its tubular housing 8 which serves to return the stick to the trimmed position. The ends of the casing 8 are open but have lipped portions which retain the end discs or plates 10 and 11 which are each slidably mounted upon the bungee rod 9 to and from which forces are transmitted by means of the nuts 9a and 9b which are secured to the rod. It will be understood that as the casing 8 of the bungee unit 5 is moved toward the left in Fig. 1, the end disc 11 will be caused to move to the left therewith. Inasmuch as the opposite end disc 10 is held fixed by the nut 9a mounted on the rod 9 which is also held fixed, the spring 7 will be compressed due to the relative telescoping of the casing 8 over the rod 9 causing the end plate 10 to be moved inwardly relative to the adjacent ends of the casing 8. Position-sensing switches 12 and 13 are mounted upon the casing 8 and are normally each in the open position when the bungee unit 5 is also in the normal unloaded condition in which both end plates 10 and 11 bear against the respective ends of the casing 8.

The bungee rod 9 is pivotally connected at 14 to the governor type trim device 15 which is securely mounted upon the fixed aircraft structure at 3a and will be described in detail below in connection with the remaining figures. The control stick 1 is provided with a stick switch 16, which it will be noted from Fig. 2, is normally open, but by being depressed can be placed in circuit with the switches 12 and 13 on the bungee unit 5 as well as with the battery or other source of electrical energy 17 and the thermal circuit breaker 18, for the actuation of the solenoid 30 in the trim device unit 15. It will be noted from Fig. 2 that relative movement of the components of the bungee unit 5 causing compression of the spring 7 results in relative movement of either of the end discs 10 or 11 depending upon the direction of movement, thereby closing the corresponding switch 12 or 13 to condition the system for closing of the stick switch 16 whenever found desirable by the pilot. For the sake of clarity, while the switches 12 and 13, and 16, as well as the solenoid 30 have been generally indicated in Fig. 1, the wiring has been omitted from that figure and may be referred to in Figs. 2 and 2A.

The control stick 1 is also pivotally connected at 6 to the push-pull rod 19 which extends aft for the control and movement of the hydraulic servomotor 20. The latter is arranged for both normal and emergency system operation and accordingly dual bell-cranks 21 and 21a are pivotally connected to the aft portion of the rod 19 and are rockably mounted upon adjacent fixed aircraft structure 3b. The control valve for normal operation of the servomotor 20 is indicated at 22 and the emergency control valve is shown at 22a. The normal valve has its sliding piston 23 pivotally connected to the bell-crank 21 and the emergency valve has its sliding piston valve 23a pivotally connected to the bell-crank 21a. The casing of the servomotor 20 is pivotally connected to the stabilizer 25 at the pivot 25a, and its piston rod 24 is pivotally connected above the motor to the fixed aircraft structure 3b. The stabilizer 25 is of the "all-movable" type and is pivoted to fixed structure 3c at 25b. The piston rod 24 has fixed thereto the piston 24a for emergency operation and the piston 24b for normal operation. The normal control valve 22 is supplied by hydraulic fluid under pressure through the line 26, and is provided with a return line 27; and the emergency control valve 22a is provided with emergency system pressure through the line 26a with a suitable return line 27a through which the fluid merely by-passes under normal operation of the servomotor.

Reference to Figs. 3 to 7, inclusive is now made for a detailed description of the improved governor trim device 15. This trim device may preferably be constructed within the channel shape frame or casing 28 upon which the front plate 28a may be releasably supported by the spacer bolt 28b extending from the back web of the channel 28, and the attachment screws 28a engaging the flatten tips of the channel flanges. The trim device 15 is connected to the bungee rod 9 at the pivot terminal 14 by means of the elongated toothed rack 29 which is slidably guided within the rack guide fitting 33 secured to the web of the channel casing 28. The rack 29 is releasably held within the guide fitting 33 and retained from sliding in the longitudinal direction by means of the brake lever 32 pivotally mounted at 34 and urged into its brake engaging position against the brake pad 35 by means of the compression spring 31. The above-mentioned solenoid 30 is supported from the web of the channel casing 28 by means of the mounting studs 30a and when energized causes rocking of the brake lever 32 in the clockwise direction about its pivot 34 thereby compressing the spring 31 and releasing the pressure on the brake pad 35. In other words the rack 29 is held in a fixed position in the longitudinal sense within its guide 33 by the action of the spring 31 against the brake lever 32 except when intentionally released by energization of the solenoid 30.

The teeth of the rack 29 are in engagement with the pinion 36 mounted upon the shaft 38 which is journalled at its ends at 38a and 38b in the channel web 28 and the cover plates 28a, respectively. The pinion shaft 38 also has fixed thereto the worm wheel 37 which engages the worm shaft 39 of the governor unit 40. The worm 39 is mounted upon the shaft 41 which is journalled at its ends within the flange portions of the channel housing 28 and has slidably mounted upon its enlarged shaft portion, by means of the hub 42a, the disc 42. The sliding hub 42a is fixed to a plurality of flexible blades 43 which are attached thereto by the screws 45 and at their opposite ends the flexible spring blades 43 are attached by similar screws 45 to the hub 44 which is fixed to the governor shaft 41. Each of the spring blades 43 has attached adjacent its mid-portion the flyweights 46, these weights being thrown out in a well known manner by centrifugal force as the assembly is rotated, imparting deflection or bowing to the spring blades 43 causing the disc 42 to be drawn to the the left in Fig. 4 toward its fixed hub 44.

The rotation of the governor assembly 40 as imparted thereto by relative telescoping movement of the rack 29 within the trim device 15 is braked and opposed by the friction pad air gap and spring tension adjustment assembly 50. The latter comprises a friction pad 47 normally spaced from the disc 40 in its stopped position by an air gap of predetermined dimension, the friction pad 47 being supported at the upper end of a flexible spring blade 48. This spring blade 48 is supported from the bifurcated fitting 49 which in turn is attached to the rack guide 33. A vertical adjustment screw 51 is guided within the fitting 49 and is engaged by the knurled wheel 52 serving as a screw nut rotatably guided between the bifurcated portions of the lower mounting fitting 49. The upper end of the adjustment screw 51 has a further support fitting or head portion 53 fixed thereto and within which is mounted a horizontal adjusting screw 54 for adjusting the gap between the disc 42 and the friction pad 47. The head fitting 43 also slidably guides the spring blades 48 such that adjustment of the wheel 52 determines the flexing characteristics of the spring 48 by establishing the length of its cantilevered portion and the further adjustment screw 54 determines the air gap between the disc 42 and the friction pad 47.

The operation of the improved system is as follows: Let us assume that a condition has developed in the aircraft which requires that the nose of the stabilizer 25 be moved downwardly, i. e., rotated in the counter-clockwise direction about its pivotal mounting 25b and that the stick 1 had to be drawn rearwardly to a certain point against the opposition of the bungees 7 in order to cause the nose of the aircraft to rise to maintain the aircraft upon its predetermined course. Rather than continue the tiring operation of the pilot's continued application of control force to the stick 1, it is only necessary that the stick switch button 16 be depressed to close the electrical circuit and energize the solenoid 30. Inasmuch as the stick 1 has been drawn rearwardly, a predetermined distance, the casing 8 of the bungee unit 5 will have been moved with the stick causing the disc 11 to be drawn farther inwardly into the casing 8 (see Fig. 2A), permitting the switch roller 13b on the arm 13a to drop into the opening 8a causing contact at 13c, thereby closing the switch 13. This serves to close the circuit thereby energizing the solenoid 30 which overcomes the effect of the spring 31, to rotate the brake lever 32 and withdraw the same from the brake pad 35 to thereby release the rack 20. The rack would, accordingly, be drawn toward the stick 1 by the spring 7 within the bungee unit 5 but due to its being geared to the pinion 36 and to the worm and worm wheel set 37—39, rotation is imparted to the shaft 41 of the governor 40. The friction disc 42 on the shaft 41 is moved into contact with the fixed pad 47 by the action of the centrifugal forces developed by the flyballs 46, thus limiting the governor speed and the rate of rack travel. The rack 29, and accordingly the rod 9 of the bungee unit, is locked in adjusted relationship at the new position by release of the switch button 16 and the application of the brake shoe 35 by de-energization of the solenoid 30. The stick load is therefore trimmed to the new zero position, for example slightly aft of the initial position, by the foregoing release of the brake which allowed the respective compression or tension forces developed in the bungee centering spring to move the rod 9 and the connected rack 29 until the spring loads were again equalized. This is accomplished without a motor or other power and an indicating light may be inserted in the circuit to show when the bungee is again unloaded. The trim unit 15 thereby provides a new ground or neutral point for the control system when the brake was re-engaged to lock the rack 29 in its new position in respect to the fixed casing of the trim device 15. In the event the governor speed and the rate of travel is either too high or too low, it may be adjusted to the optimum rate by the adjustment mechanism 50.

The improved system disclosed herein also has the advantage that when the artificial feel bungees are located near the servo valves, it is possible to synchronize the aileron trim actuators without a trim cable system as required heretofore. In certain installations the disclosed micro-switches may either be completely omitted, or other means substituted therefor, and their use with the governor type device is optional. The arrangement also provides that where desirable one trim button can be used to trim both the ailerons and the horizontal stabilizer simultaneously. Trim overshoot is also eliminated inasmuch as the trim device is automatically shut off when the trimmed position is reached. It is also possible to increase the trim rate thereby reducing the time required to accomplish the trim. Previously, in prior devices the trim rate was limited by the overshoot problem which now is not met within the improved device. The present semiautomatic trim device can also be utilized in connection with the autopilot of the aircraft automatic control system.

Other forms and modifications of the present invention which will occur to those skilled in the art after reading the following description, are intended to come within the scope and spirit of this invention, as more particularly set forth in the appended claims.

We claim:

1. In a airplane trim control, including a bungee device operatively connected to said control, said bungee device comprising relatively movable members opposed by resilient means, a trim device fixedly supported from the aircraft structure, said trim device having an element operatively connected to said bungee device and relatively movable with respect to said trim device, and means including a solenoid-actuated lock for selectively locking and releasing said movable element with respect to said trim device, said trim device including governor means operatively connected to said movable element for controlling the rate of movement thereof, the improvement wherein said movable element of said trim device is in the form of a toothed rack and said governor means includes a pinion in operative engagement with said toothed rack, whereby displacement of said control from its neutral position imparting relative movement to said bungee members causes deformation of said resilient means, and selective unlocking of said movable element permits its relative movement with respect to said trim device at a rate controlled by said governor means under the influence of the energy stored in said resilient means to provide a new neutral position for said control at which further displacement in either direction will be resiliently opposed by said bungee device.

2. In a trim control for an aircraft control surface, including a servomotor for the actuation of said surface, a pilot control operatively connected to said servomotor for the power actuation of said surface by said pilot control, imitation feel creating means operatively connected to said pilot control and including resilient means normally opposing displacement of said pilot control from its neutral position, trim means fixedly supported from the aircraft having a normally locked member operatively engaged with said resilient means of said feel means for assisting said resilient means in opposing displacement of said pilot control to obtain a trimmed condition of the aircraft, said trim including a governor operatively connected to said normally locked member, and selectively controllable means operatively connecting said pilot control with said trim means, the improvement wherein said normally locked member is a toothed rack reciprocably guidable within said trim means and said governor includes a toothed pinion in continual meshing engagement with the said normally locked toothed rack member, and said selectively controllable means includes a solenoid-actuated brake for unlocking said member from said trim means to permit its relative guidable movement with respect to said trim means under the influence of said resilient element at a rate of movement determined by said governor when said resilient element has been displaced by said pilot control.

3. A governor mechanism for use with an airplane control including a resilient bungee device operatively connected to said control, said bungee device comprising relatively telescoping members opposed by resilient means, a trim device fixedly supported from the aircraft structure, said trim device having a reciprocable member operatively connected to one of the said telescoping members of said bungee device, said trim device member relatively movable with respect to said trim device, and means including a solenoid-actuated brake for selectively locking and releasing said reciprocable trim device member with respect to said trim device, displacement of the airplane control imparting relative telescoping of said bungee members and deformation of said resilient means, the said governor comprising a centrifugal flyweight rotating assembly operatively connected in a speed increasing ratio by a worm and worm wheel and a toothed pinion, said reciprocable trim device member being in the form of a toothed rack in continual meshing engagement with said toothed pinion whereby selective unlocking of said reciprocable trim device member permits its relative reciprocable movement at a rate with respect to said trim device which is determined by said governor and transmitted to it by said toothed rack member and said pinion under the influence of the energy stored in said resilient means to provide a new ground position for said control at which further displacement in either direction will be resiliently opposed by said bungee device.

4. In aircraft, a trim device for inter-positioning between a pilot control having an attached bungee device and the aircraft structure, the said trim device comprising a housing frame, a toothed rack member guidably reciprocable within said housing frame and normally locked thereto, a toothed pinion rotatably mounted within said housing frame and in continual meshing engagement with said toothed rack member, fly-weight type governor means in rotational engagement with said toothed pinion and brake means arranged for selective unlocking of said toothed rack member to said housing frame whereby its reciprocable movement under the influence of the bungee-biased pilot control is transmitted through said toothed pinion to said governor device for control of the rate of movement of the pilot control to its new neutral position.

References Cited in the file of this patent
UNITED STATES PATENTS

| | | |
|---|---|---|
| 2,208,846 | Hurlbut | July 23, 1940 |
| 2,639,108 | Feeney et al. | May 19, 1953 |
| 2,673,049 | Talbot | Mar. 23, 1954 |
| 2,678,179 | Feeney et al. | May 11, 1954 |